(12) United States Patent
Westerfield (10) Patent No.: US 7,012,246 B1
(45) Date of Patent: Mar. 14, 2006

(54) MULTIPLE LIGHT BEAM IMAGING APPARATUS

(75) Inventor: Eric Wayne Westerfield, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/924,722

(22) Filed: Aug. 23, 2004

(51) Int. Cl.
  *H01J 3/14* (2006.01)
  *G02B 26/08* (2006.01)

(52) U.S. Cl. .................. 250/234; 250/235; 347/235; 347/236; 359/204

(58) Field of Classification Search ............ 250/208.1, 250/234–236; 347/233–237, 241, 243; 359/204, 359/212, 216, 226
  See application file for complete search history.

(56) References Cited

U.S. PATENT DOCUMENTS

| | | | |
|---|---|---|---|
| 4,788,560 A | 11/1988 | Miura | |
| 4,878,066 A | 10/1989 | Shiraishi | |
| 5,300,956 A | 4/1994 | Ohta et al. | |
| 5,305,022 A | 4/1994 | Ota et al. | |
| 5,471,236 A | 11/1995 | Ito | |
| 5,691,759 A | 11/1997 | Hanson | |
| 5,774,248 A | 6/1998 | Komatsu | |
| 5,966,231 A | 10/1999 | Bush et al. | |
| 6,037,962 A | 3/2000 | Hanson et al. | |
| 6,037,963 A | 3/2000 | Denton et al. | |
| 6,064,417 A | 5/2000 | Harrigan et al. | |
| 6,160,610 A | 12/2000 | Toda | |
| 6,236,040 B1 * | 5/2001 | Takemura et al. | .......... 250/235 |
| 6,340,983 B1 | 1/2002 | Hamada et al. | |
| 6,433,809 B1 | 8/2002 | Kodama | |
| 6,466,359 B1 | 10/2002 | Sunagawa | |
| 6,633,322 B1 | 10/2003 | Sakai et al. | |
| 2001/0028388 A1 | 10/2001 | Makino | |
| 2002/0149666 A1 | 10/2002 | Amada et al. | |
| 2002/0154207 A1 | 10/2002 | Beier et al. | |
| 2002/0159122 A1 | 10/2002 | Aoki et al. | |
| 2003/0133175 A1 | 7/2003 | Suzuki et al. | |
| 2004/0017598 A1 | 1/2004 | Seki et al. | |
| 2004/0032631 A1 | 2/2004 | Amada et al. | |

* cited by examiner

*Primary Examiner*—Kevin Pyo
(74) *Attorney, Agent, or Firm*—Taylor & Aust, P.C.

(57) ABSTRACT

An imaging apparatus includes a controller communicatively coupled to a first laser, a second laser, a scanning device and a light sensor. The controller is configured to perform actions including controlling the first laser, the second laser and the scanning device to simultaneously scan the first light beam and the second light beam across an image region of the photoconductive substrate over a plurality of scans to form a latent image on the photoconductive substrate; activating only the first laser outside the image region between first successive scans of the plurality of scans to sense with the light sensor the first light beam; and activating only the second laser outside the image region between second successive scans of the plurality of scans to sense with the light sensor the second light beam.

4 Claims, 5 Drawing Sheets

| PRINT LINE | Pitch (μm) | SCAN 1 | SCAN 2 | SCAN 3 | SCAN 4 | SCAN X |
|---|---|---|---|---|---|---|
| | 42.3 | LASER 34a | | | | |
| S | 42.3 | | BLANK LINE | | | |
| 1 | 42.3 | | LASER 34a | | | |
| 2 | 42.3 | LASER 34b | | | | |
| 3 | 42.3 | | | LASER 34a | | |
| 4 | 42.3 | | LASER 34b | | | |
| 5 | 42.3 | | | | LASER 34a | |
| 6 | 42.3 | | | LASER 34b | | |
| 7 | 42.3 | | | | | LASER 34a |
| 8 | 42.3 | | | | LASER 34b | |
| | 42.3 | | BLANK LINE | | | |
| | 42.3 | | | | | LASER 34b |

MULTIPLE LIGHT BEAM IMAGING APPARATUS

BACKGROUND OF THE INVENTION

1. Field of the Invention

The present invention relates to an imaging apparatus, and, more particularly, to an apparatus and method for controlling the operation of multiple light emitters in an imaging apparatus.

2. Description of the Related Art

An imaging apparatus may include an electrophotographic (EP) print engine that forms a latent image on a photoconductive substrate. The EP print engine may include two or more light sources, such as for example, two or more lasers. This allows two or more scan lines to be swept across the photoconductive substrate simultaneously. For example, the use of a dual laser diode arrangement may increase the pages per minute by 2 times over the pages per minute of a single laser diode arrangement, all other things being the same.

What is needed in the art is an apparatus and method for controlling the operation of multiple light emitters in an imaging apparatus.

SUMMARY OF THE INVENTION

The present invention provides an apparatus and method for controlling the operation of multiple light emitters in an imaging apparatus.

The present invention, in one form thereof, relates to an imaging apparatus for forming an image on a photoconductive substrate. The imaging apparatus includes a first laser emitting a first light beam, a second laser emitting a second light beam, and a scanning device for reflecting the first light beam and the second light beam. A light sensor is positioned to receive at least one of the first light beam and the second light beam. A controller is communicatively coupled to the first laser, the second laser, the scanning device and the light sensor. The controller is configured to perform actions including controlling the first laser, the second laser and the scanning device to simultaneously scan the first light beam and the second light beam across an image region of the photoconductive substrate over a plurality of scans to form a latent image on the photoconductive substrate; activating only the first laser outside the image region between first successive scans of the plurality of scans to sense with the light sensor the first light beam; and activating only the second laser outside the image region between second successive scans of the plurality of scans to sense with the light sensor the second light beam.

The present invention, in another form thereof, is directed to an imaging apparatus, including a light source having a plurality of light emitters operating simultaneously for forming a latent image on a substrate with a plurality of imaging scans. A light intensity sensor is positioned to receive light from the plurality of light emitters, the light intensity sensor providing a single output representing the light received. A controller is communicatively coupled to the plurality of light emitters and to the light intensity sensor. The controller executes instructions for adjusting an individual power output of each of the plurality of light emitters by energizing only one light emitter of the plurality of light emitters at a time between any two successive imaging scans of the plurality of imaging scans across the substrate until the individual power output of each of the plurality of light emitters has been adjusted.

The present invention, in still another form thereof, is directed to an imaging apparatus, including a light source having a plurality of light emitters operating simultaneously to emit light for forming a latent image on a substrate. An HSYNC detector is configured and positioned to receive light from each of the plurality of light emitters between scans of the light source across the substrate. The HSYNC detector outputs a signal representing an intensity of light received from the light source. A controller is communicatively coupled to the plurality of light emitters and to the HSYNC detector. The controller synchronizes a timing of data and a scan of the light across the substrate based on the signal received from the HSYNC detector. The controller individually energizes the plurality of light emitters one at a time in a sequential manner with a correspondence of only one light emitter being energized between any two successive scans of the light across the substrate.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an exemplary embodiment of the invention, and such exemplifications are not to be construed as limiting the scope of the invention in any manner.

DETAILED DESCRIPTION OF THE INVENTION

Figure 1A:
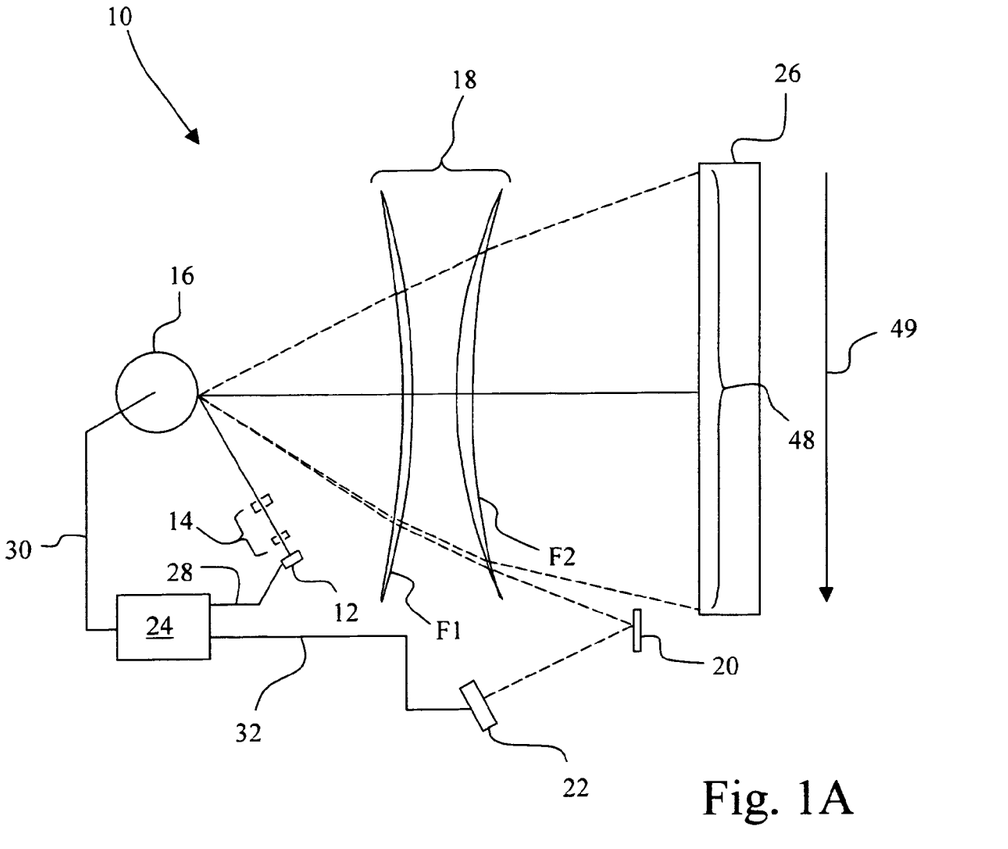
FIG. 1A is a diagrammatic top view representation of an imaging apparatus configured in accordance with the present invention.
Figure 1B:
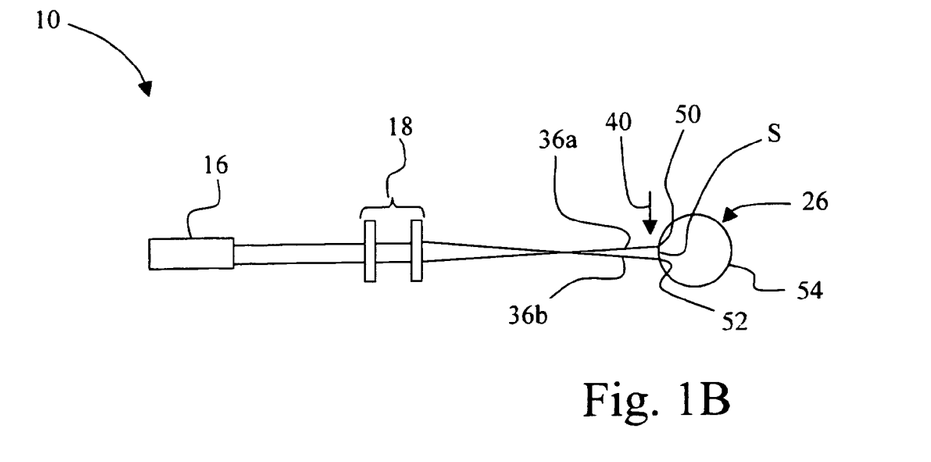
FIG. 1B is a diagrammatic side view representation of a portion of the imaging apparatus of FIG. 1A.

Referring now to the drawings and particularly to FIGS. 1A and 1B, there is shown a diagrammatic representation of an imaging apparatus 10 configured in accordance with the present invention. Imaging apparatus 10 includes a light source module 12, a pre-scan optics arrangement 14, a scanning device 16, e.g., a multi-faceted mirror, an f-theta lens arrangement 18, a mirror 20, a light intensity sensor 22, a controller 24 and a photoconductive substrate 26. Photoconductive substrate 26 may be, for example, a rotating photoconductive drum of a type well known in the electrophotographic imaging arts, and may be formed as a part of an imaging cartridge that includes a supply of toner.

Controller 24 is communicatively coupled to light source module 12 via communication link 28. Controller 24 is communicatively coupled to scanning device 16 via communication link 30. Controller 24 is communicatively coupled to light intensity sensor 22 via communication link 32. Each of communications links 28, 30, 32 may be, for example, a multi-conductor electrical cable.

Figure 1C:
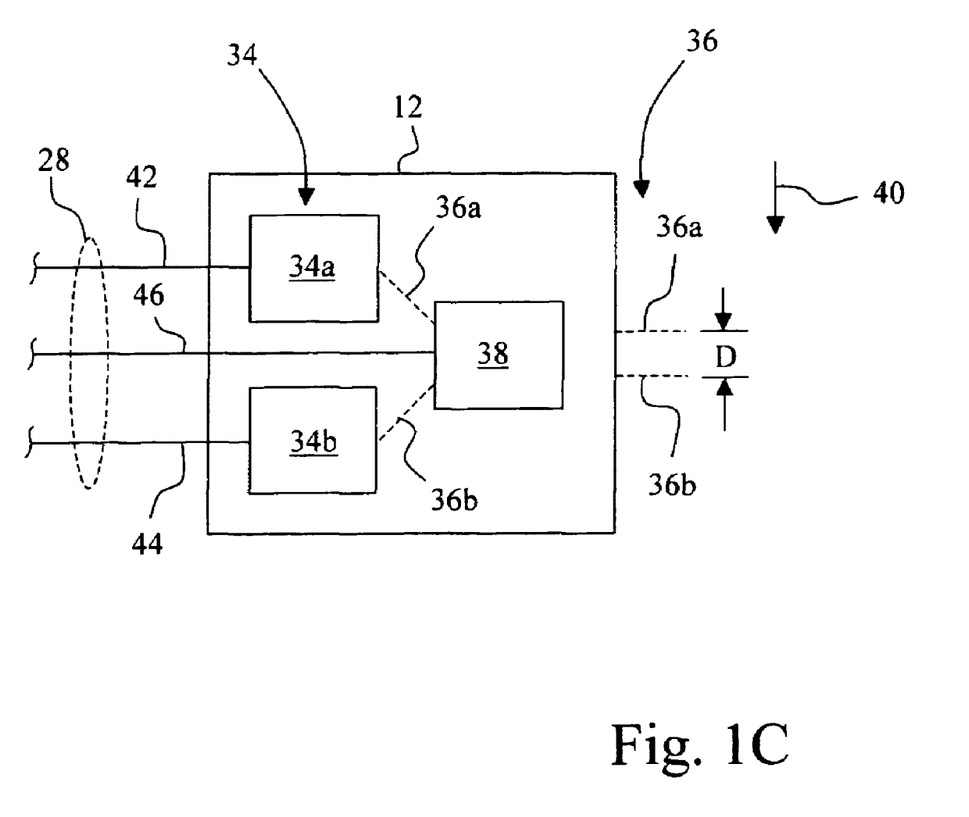
FIG. 1C is a diagrammatic representation of a light source module of the imaging apparatus of FIG. 1A.

As further diagrammatically illustrated in FIG. 1C, light source module 12 may include interface electronics, and further includes a plurality of light emitters 34 emitting a plurality of light beams 36, and an internal light sensor 38. Light source module 12 may be, for example, a unitary structure in the form of a monolithic dual laser diode module, such as for example, a Sony® SLD265BRP module, which has an output of two 10 milli-Watt (mW) laser beams, each having a 780 nanometer (nm) wavelength, that are separated by a distance D, such as for example 14 micons ($\mu$m), in the process (cross scan) direction 40.

Accordingly, the plurality of light emitters 34 may include, for example, a first laser 34a emitting a first light beam 36a and a second laser 34b emitting a second light beam 36b. Light beams 36a, 36b may also be referred to as laser beams 36a, 36b, in the example that follows. Internal light sensor 38 may be, for example, a photo diode integral to the module having a single output, and which generates an output current, $i_p$, which is proportional to the optical power output of the light received from laser 34a and/or laser 34b. As such, communications link 28 includes a conductor 42 connected to laser 34a, a conductor 44 connected to laser 34b, and a conductor 46 connected to internal light sensor 38, with each of conductors 42, 44 and 46 also being connected to controller 24.

During operation, light emitters 34 of light source module 12 emit the plurality of light beams 36 (e.g., 36a, 36b) which are collected and focused by pre-scan optics arrangement 14, which may include a collimation lens, onto the rotating multi-faceted reflective surface of scanning device 16, which in turn scans light beams 36 over the surface of photoconductive substrate 26. More particularly, for example, controller 24 performs actions including controlling laser 34a, laser 34b and scanning device 16 to simultaneously scan light beam 36a and light beam 36b across an image region 48 of photoconductive substrate 26 over a plurality of scans to form a latent image on photoconductive substrate 26. As shown in FIGS. 1A and 1B, F-theta lens arrangement 18, which includes f-theta lenses F1 and F2, is configured to affect light beam position in both a scan direction 49 across photoconductive substrate 26 and in process direction 40, i.e., a direction orthogonal to the scan direction 49. Further, f-theta lens arrangement 18 is utilized to magnify the light beam spacing in the process direction 40 to meet the requirements of the particular application.

For example, referring to FIG. 1B, the spacing, S, in process direction 40 between the laser beam scan lines 50, 52, on the photoconductor image surface 54 of photoconductive substrate 26 may be described by the following equation:

$$S = (n+1) \times p \qquad \text{Equation \{1\}}$$

where: p is the desired pitch of adjacent lines of the latent image formed on photoconductor image surface 54, and hence the developed image on the print media, and n is the number of laser diodes in the module (two in the present example).

Thus, in the case of a desired 600 dpi imaging, the desired pitch, p, is:

$$p = 25,400 \ (\mu\text{m/in.}) \times [1/600](\text{in/scan}) = 42.3 \ \mu\text{m/scan} \qquad \text{Equation \{2\}}$$

Thus, for 600 dpi laser imaging, p=42.3 $\mu$m/scan, and for dual diode laser imaging, n=2. Thus from Equation {1}:

$$S = (2+1) \times 42.3 = 127 \ \mu\text{m} \qquad \text{Equation \{3\}}$$

In the dual diode example, the pre-scan optics arrangement 14 and the f-theta lens arrangement 18 magnify the 14 $\mu$m spacing between the light beams 36a, 36b in light source module 12 into a 127 $\mu$m spacing between the scan lines 50, 52 at photoconductor imaging surface 54 for 600 dpi imaging on photoconductive substrate 26.

Figure 2:
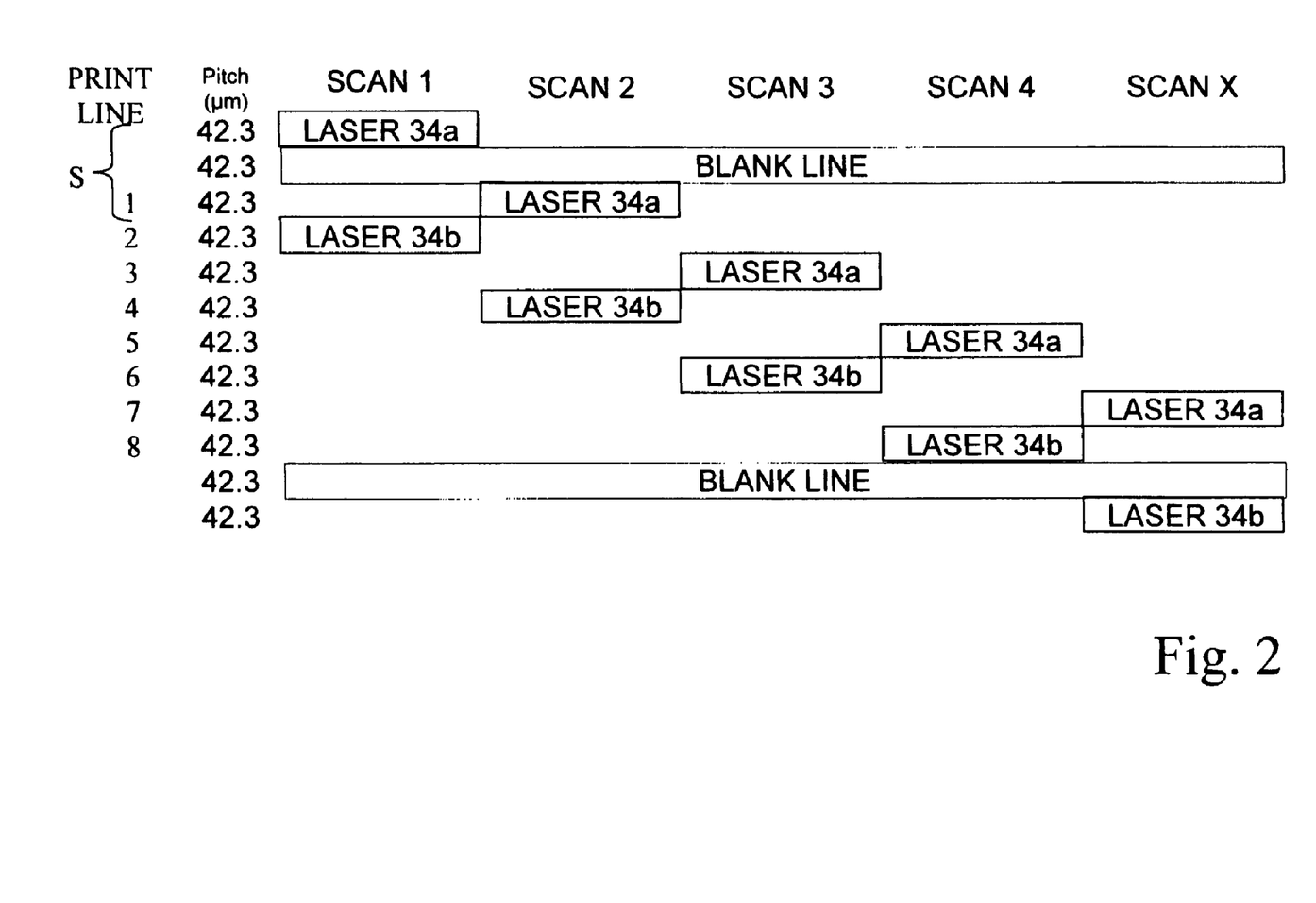
FIG. 2 is a diagrammatic depiction of an exemplary embodiment of a dual laser beam interleaving pattern produced by the imaging apparatus and light source module of FIGS. 1A–1C.

In accordance with the present example, FIG. 2 is a diagrammatic depiction of an exemplary embodiment of a dual laser beam interleaving pattern that achieves the desired 600 dpi imaging at photoconductor image surface 54 over an entire media page. It is to be noted that the second row in dual laser beam interleaving pattern is labeled as a blank line, as is the next to last row in the dual laser beam interleaving pattern. The row after the top blank line represents the first line that would be printable at the top of a page of a print media. The row just above the bottom blank line represents the last line that would be printable at the bottom of a page of a print media. Thus, for the first scan of the dual diode laser beams 36a, 36b across photoconductor image surface 54, at the start of a new page of a media, at Scan 1, only laser 34b will be energized. Also, as shown in FIG. 2, laser beam 36a of laser 34a would be outside the desired print area on the page during Scan 1 and thus would not receive any image data during Scan 1. During Scan 1, laser 34b would receive the appropriate image data to image the second print line onto the photoconductor. When the second scan, Scan 2, of the simultaneous imaging of the two laser beams 36a, 36b begins, the photoconductor image surface 54 will have moved such that the two simultaneous laser beams will image a distance of 2 print lines down the page of the media. Thus, in Scan 2, laser 34a now receives the appropriate image data to image the first print line onto photoconductor image surface 54 and laser 34b receives the appropriate image data to image the fourth print line onto photoconductor image surface 54. An entire page of a image data will be imaged onto photoconductor image surface 54 continuing this pattern of laser 34a imaging the odd print lines and laser 34b imaging the even print lines. Similar to the situation at the top of a page, at the bottom of the page, during the last scan, Scan X, only laser 34a receives and images appropriate image data to image the next to the last print line (print line 7). During Scan X, laser 34b is not energized because it would image outside the desired print area.

Thus, as depicted in FIGS. 1B and 2, the spacing S between the dual laser beams 36a, 36b of lasers 34a, 34b, respectively, is 127 $\mu$m at photoconductor image surface 54 to achieve the 600 dpi interleaving of the laser beam scans on photoconductive substrate 26. Because photoconductive substrate 26 moves, i.e., rotates, a distance of two print lines between scans, scanning device 16 may rotate at one-half the speed that would be required if only a single diode were used to image the data (all other properties remaining the same).

In a similar manner, the same interleaving pattern may be used to achieve true 1200 dpi imaging with a dual laser diode module, such as light source module 12. The only changes in FIG. 2 are that the pitch p is now 21.17 $\mu$m as shown in Equation {4} and thus the dual laser diode images on photoconductor image surface 54 must be spaced 63.5 $\mu$m apart as shown in Equation {5}.

$$p = 25,400 \ (\mu\text{m/in.}) \times [1/1200](\text{in/scan}) = 21.17 \ \mu\text{m/scan} \quad \text{Equation \{4\}}$$

Thus, for 1200 dpi laser printing, p=21.17 μm/scan, and for dual diode laser printing, n=2. Thus from Equation {1}:

$$S=(2+1)\times 21.17=63.5 \text{ μm} \quad \text{Equation \{5\}}$$

To achieve the 63.5 μm spacing of the dual laser beams at photoconductor image surface 54, changes in the pre-scan optics (the collimation lens/pre-scan lens combination) and/or the f-theta F1 and F2 lenses may be made. The tooling for the f-theta F1 and F2 lenses may be time consuming and expensive, so the preference is to modify the pre-scan optics arrangement 14 to change the magnified dual laser beam spacing at the photoconductor image surface 54 to meet either of these requirements as desired without significant impact to the f-theta F1 or F2 lenses.

In order to coordinate the delivery of image data to lasers 34a, 34b, the present invention utilizes light intensity sensor 22 as a single horizontal synchronization (HSYNC) detector, which will be referred to as HSYNC detector 22. The single HSYNC detector 22 provides a single output representing the light received in the form of an HSYNC signal to controller 24, which in turn controls the laser scanning timing for both laser 34a and laser 34b, in the exemplary dual diode laser printer application. HSYNC detector 22 may be, for example, a photo diode that is located to intercept a laser beam, e.g., one or both of light beams 36a, 36b, outside the desired imaging region 48, and may be at the same image plane location as photoconductor image surface 54. Mirror 20 is used to deflect the light beam(s) out of its path toward photoconductor image surface 54 and direct it to light intensity sensor 22. In this way, after a scan line has been imaged onto photoconductor image surface 54 and the laser beam imaging window has been turned off, the laser beam (e.g., one or both of light beams 36a, 36b) is turned on again in generating the HSYNC signal from the HSYNC detector 22, which in turn is supplied to controller 24. The HSYNC signal output of HSYNC detector 22 indicates to controller 24 when the laser beam(s) cross the location of HSYNC detector 22 in the horizontal, or scan direction, 49. This serves as a closed loop control to synchronize the timing of image data to the respective laser 34a, 34b and the scan of light beams 36a, 36b of lasers 34a, 34b of light source module 12, such that the starting location of each scan line is maintained essentially uniform in the face of any speed variations and any facet-to-facet variations of scanning device 16 from the ideal nominal design point. Controller 24 thus individually energizes the plurality of light emitters 34, e.g., lasers 34a, 34b, one at a time in a sequential manner with a correspondence of only one light emitter being energized between any two successive scans of the emitted light across photoconductive substrate 26, e.g., between any two successive scans of light beams 36a, 36b.

In the dual laser diode case, both of lasers 34a, 34b may be simultaneously energized between each scan to detect the HSYNC signal from the single shared light intensity sensor 22. Energizing both laser 34a and laser 34b delivers essentially twice the power to light intensity sensor 22, thus resulting in a more robust HSYNC signal. The up to 127 μm process direction spacing between light beam 36a and light beam 36b at photoconductor image surface 54 may be focused onto the same light intensity sensor 22 by using an HSYNC lens (not shown).

Figure 3:
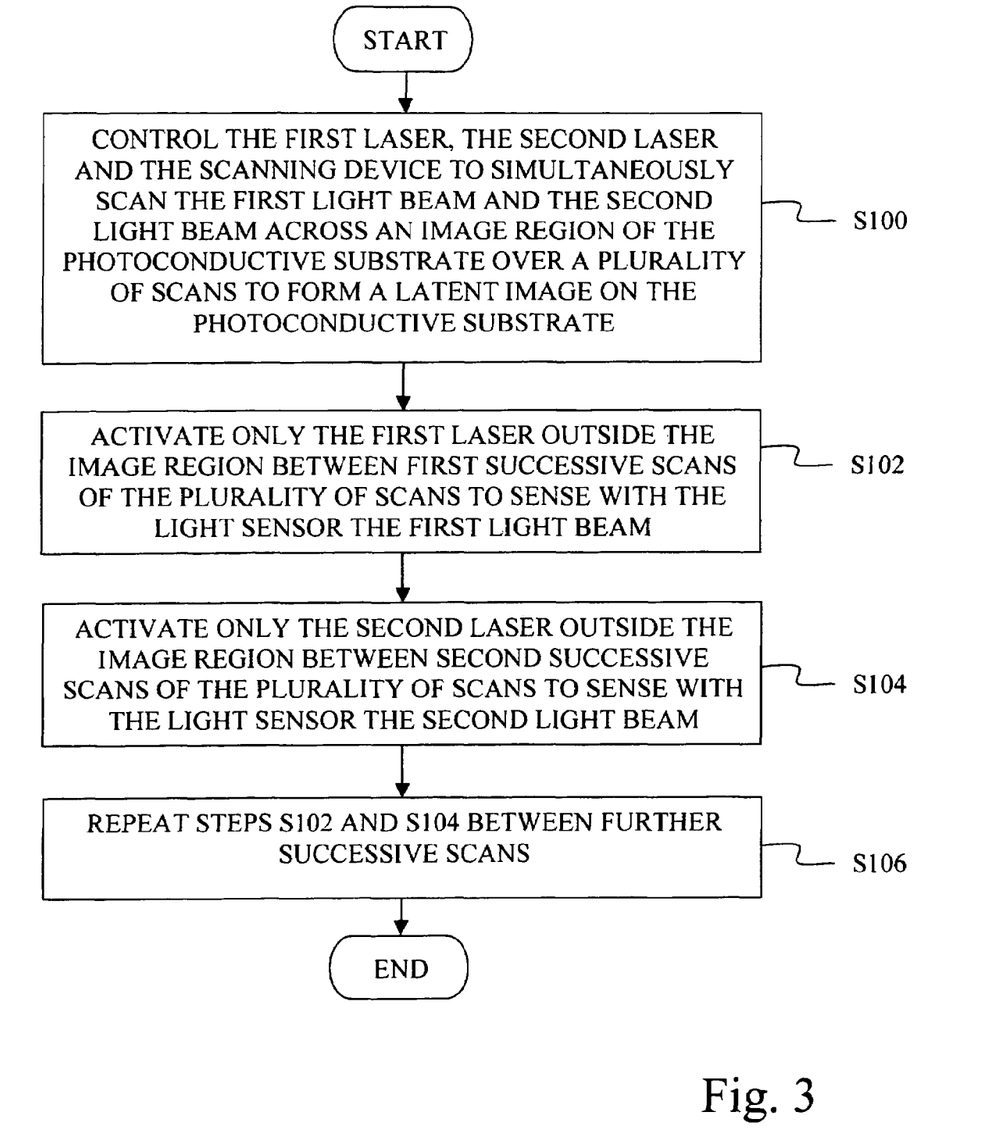
FIG. 3 is a flowchart illustrating an HSYNC detection method in accordance with the present invention.

An alternative HSYNC detection approach in accordance with the present invention is illustrated by the flowchart of FIG. 3. Controller 24 may be configured through the execution of program instructions to perform the desired actions of the enumerated steps of FIG. 3.

At step S100, controller 24 controls laser 34a, laser 34b and scanning device 16 to simultaneously scan light beam 36a and light beam 36b (e.g., laser beams) across image region 48 of the photoconductor image surface 54 of photoconductive substrate 26 over a plurality of scans, e.g., Scan 1, Scan 2, Scan 3, Scan 4, . . . , Scan X, to form a latent image on photoconductive substrate 26.

At step S102, controller 24 activates only laser 34a outside image region 48 between first successive scans, e.g., between Scan 1 and Scan 2, of the plurality of scans to sense with a light sensor, e.g., HSYNC detector 22, light beam 36a. Controller 24 then utilizes the HSYNC signal generated by HSYNC detector 22 to synchronize the timing of the image data to be supplied to all of the light emitting elements, e.g., both of lasers 34a, 34b, of light source module 12, during a particular scan, e.g., Scan 2, with the position of the corresponding light beams, e.g., light beams 36a, 36b, for all of the light emitting elements, e.g., both of lasers 34a, 34b. The term "activate" is used to describe a level of current needed to cause a particular laser to emit laser light. However, a laser that is not activated may still use a bias current at a level insufficient to generate laser light, but sufficient to reduce the turn-on time of the laser.

At step S104, controller 24 activates only laser 34b outside image region 48 between second successive scans, e.g., between Scan 2 and Scan 3, of the plurality of scans to sense with the light sensor, e.g., HSYNC detector 22, light beam 36b. Controller 24 then utilizes the HSYNC signal generated by HSYNC detector 22 to synchronize the timing of the image data to be supplied to all of the light emitting elements, e.g., both of lasers 34a, 34b, of light source module 12, during a particular scan, e.g., Scan 3, with the position of the corresponding light beams, e.g., light beams 36a, 36b, for all of the light emitting elements, e.g., both of lasers 34a, 34b.

At step S106, steps S102 and S104 are repeated between further successive scans during forming of the latent image on photoconductive substrate 26 until imaging is completed. In this example, step S102 would be repeated between Scan 3 and Scan 4, and step S104 would be repeated between Scan 4 and Scan 5, and so on, until the imaging is completed.

Thus, in accordance with the method depicted in the flowchart of FIG. 3, the present invention alternately energizes laser 34a to detect the next scan HSYNC location and then after the next scan energizes laser 34b. In this way, the total life expectancy of the diodes of lasers 34a, 34b may be distributed and the operation of each diode is individually checked after every other scan by the detection of the presence of the associated light beam. Those skilled in the art will recognize that either of lasers 34a or 34b could be selected to be energized between the first consecutive scans, and the other of lasers 34a or 34b could be selected to be energized between the second consecutive scans.

With regard to another aspect of the present invention, it is desirable to monitor the power output of each of lasers 34a and 34b, and make appropriate changes to the light output of lasers 34a and/or 34b in order to maintain a constant power output. Accordingly, in accordance with the present invention, the current, $i_p$, output by internal light sensor 38 is sensed between each scan and the current which drives the laser diode power for a respective one of lasers 34a, 34b is adjusted to correct for any drift which may have occurred. In this way, the laser output power imaged at photoconductor image surface 54 is maintained at an essentially constant level throughout the imaging operation, both during a page and page-to-page.

Referring to FIG. 1C, in light source module 12, which includes lasers 34a, 34b, the sense current, $i_P$, is proportional to the sum of the power out of each laser diode, $P_1+P_2$, if both of lasers 34a and 34b are energized simultaneously. However, the desire is to adjust the laser power level of each laser beam individually. At lower rotational speeds, for example, the laser power may be checked and adjusted sequentially, one at a time, but both between each scan. Thus, when controller 24 commands that only laser 34a is to be activated at a predetermined level, the sense current, $i_P$, is proportional to only the power $P_1$ associated with light beam 36a, and any bias current associated with laser 34b is assumed to be insignificant. Then, laser 34a may be turned off and laser 34b only is commanded to be activated at a predetermined level, and any bias current associated with laser 34a is assumed to be insignificant. Repeating the process, the sense current, $i_P$, is now proportional to only the laser power $P_2$ associated with light beam 36b.

Figure 4:
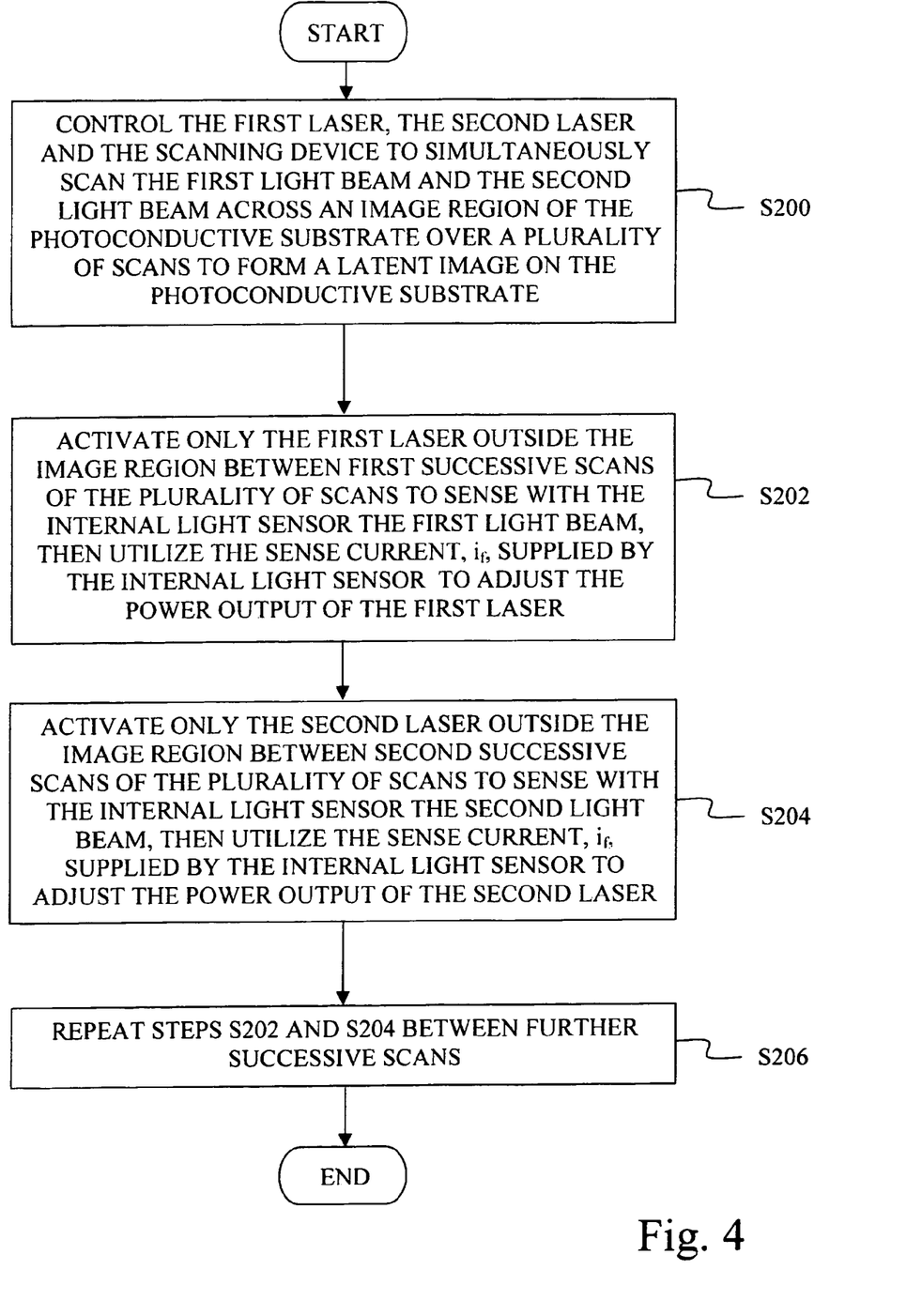
FIG. 4 is a flowchart illustrating a laser power determination and adjustment method in accordance with the present invention.

However, if the polygon speed exceeds the ability of controller 24 and the light source module 12 to be energized, current sensed, and the laser power adjusted for each laser diode sequentially between each scan, then the process, as illustrated in the flowchart of FIG. 4 may be used. Controller 24 may be configured through the execution of program instructions to perform the desired actions of the enumerated steps of FIG. 4.

At step S200, controller 24 controls laser 34a, laser 34b and scanning device 16 to simultaneously scan light beam 36a and light beam 36b (e.g., laser beams) across image region 48 of the photoconductor image surface 54 of photoconductive substrate 26 over a plurality of scans, e.g., Scan 1, Scan 2, Scan 3, Scan 4, Scan X, to form a latent image on photoconductive substrate 26.

At step S202, controller 24 activates only laser 34a outside image region 48 between first successive scans, e.g., between Scan 1 and Scan 2, of the plurality of scans to sense, with internal light sensor 38 of light source module 12, the light intensity of light beam 36a. Controller 24 then utilizes the sense current, $i_P$, supplied by internal light sensor 38 to adjust the power output of laser 34a.

At step S204, controller 24 activates only laser 34b outside image region 48 between second successive scans, e.g., between Scan 2 and Scan 3, of the plurality of scans to sense, with internal light sensor 38 of light source module 12, the light intensity of light beam 36b. Controller 24 then utilizes the sense current, $i_P$, supplied by internal light sensor 38 to adjust the power output of laser 34b.

At step S206, steps S202 and S204 are repeated between further successive scans during forming of the latent image on photoconductive substrate 26 until imaging is completed. In this example, step S102 would be repeated between Scan 3 and Scan 4, and step S104 would be repeated between Scan 4 and Scan 5, and so on, until the imaging is completed. Thus, once the power of each and all of the plurality of light emitters 34 has been adjusted, the process is repeated.

Thus, for example, controller 24 executes instructions for adjusting an individual power output of each of the plurality of light emitters 34 by energizing only one of the plurality of light emitters 34 at a time between any two successive imaging scans of the plurality of imaging scans across photoconductive substrate 26 until the power output of each of the plurality of light emitters 34 has been adjusted. As a more specific example, between Scan 1 and Scan 2, only laser 34a is energized at a predetermined level and only the optical power output of laser 34a is adjusted between Scan 1 and Scan 2. Between Scan 2 and Scan 3, only laser 34b is energized at a predetermined level and only the optical power output of laser 34b is adjusted between Scan 2 and Scan 3. This process continues, alternately adjusting the power of laser 34a on one scan sweep and laser 34b on the next scan sweep. Drift of the laser diode power over two scan sweeps was determined to be not significant, especially as the scan speed of scanning device 16 becomes higher.

While this invention has been described with respect to an exemplary embodiment, the present invention can be further modified within the spirit and scope of this disclosure. For example, the present invention has been described with respect to an exemplary embodiment having two light emitters, e.g., two lasers, but those skilled in the art will recognize that the principles of the present invention may be applied to an imaging apparatus having two or more light emitters. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An imaging apparatus for forming an image on a photoconductive substrate, comprising:
   a first laser emitting a first light beam;
   a second laser emitting a second light beam;
   a scanning device for reflecting said first light beam and said second light beam;
   an HSYNC detector positioned to receive at least one of said first light beam and said second light beam; and
   a controller communicatively coupled to said first laser, said second laser, said scanning device and said HSYNC detector, said controller being configured to perform actions including:
   (a) controlling said first laser, said second laser and said scanning device to simultaneously scan said first light beam and said second light beam across an image region of said photoconductive substrate over a plurality of scans to form a latent image on said photoconductive substrate;
   (b) activating only said first laser outside said image region between first successive scans of said plurality of scans to sense with said HSYNC detector said first light beam;
   (c) activating only said second laser outside said image region between second successive scans of said plurality of scans to sense with said HSYNC detector said second light beam; and
   (d) alternating between performing action (b) and action (c) between further successive scans during said forming of said latent image.

2. An imaging apparatus, comprising:
   a light source including a plurality of light emitters operating simultaneously for forming a latent image on a substrate with a plurality of imaging scans;
   a light intensity sensor positioned to receive light from said plurality of light emitters, said light intensity sensor providing a single output representing said light received; and
   a controller communicatively coupled to said plurality of light emitters and to said light intensity sensor, said controller executing instructions for adjusting an individual power output of each of said plurality of light emitters by energizing only one light emitter of said plurality of light emitters at a time between any two successive imaging scans of said plurality of imaging scans across said substrate until said individual power output of each of said plurality of light emitters has been adjusted.

3. The imaging apparatus of claim 2, wherein said controller repeats said adjusting of said individual power output of each of said plurality of light emitters after all of said plurality of light emitters have been adjusted.

4. An imaging apparatus, comprising:
 a light source including a plurality of light emitters operating simultaneously to emit light for forming a latent image on a substrate;
 an HSYNC detector configured and positioned to receive light from each of said plurality of light emitters between scans of said light source across said substrate, said HSYNC detector outputting a signal representing an intensity of light received from said light source; and
 a controller communicatively coupled to said plurality of light emitters and to said HSYNC detector, said controller synchronizing a timing of data and a scan of said light across said substrate based on said signal received from said HSYNC detector, said controller individually energizing said plurality of light emitters one at a time in a sequential manner with a correspondence of only one light emitter being energized to provide light to said HSYNC detector between any two successive scans of said light across said substrate.

* * * * *